United States Patent
Yang et al.

(10) Patent No.: US 11,732,082 B2
(45) Date of Patent: Aug. 22, 2023

(54) TWO-COMPONENT POLYURETHANE COMPOSITION

(71) Applicant: Dow Global Technologies LLC, Midland, MI (US)

(72) Inventors: Xiaohong Yang, Shanghai (CN); Jinfei Wang, Shanghai (CN); Fengzhe Shi, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/777,724

(22) PCT Filed: Dec. 6, 2019

(86) PCT No.: PCT/CN2019/123560
§ 371 (c)(1),
(2) Date: May 18, 2022

(87) PCT Pub. No.: WO2021/109106
PCT Pub. Date: Jun. 10, 2021

(65) Prior Publication Data
US 2022/0411568 A1    Dec. 29, 2022

(51) Int. Cl.
| | | |
|---|---|---|
| *C08G 18/62* | (2006.01) | |
| *C08G 18/08* | (2006.01) | |
| *C08G 18/73* | (2006.01) | |
| *C09D 5/02* | (2006.01) | |
| *C09D 175/04* | (2006.01) | |
| *C08F 2/26* | (2006.01) | |
| *C09D 133/14* | (2006.01) | |
| *C09D 175/14* | (2006.01) | |

(52) U.S. Cl.
CPC ............ *C08G 18/6291* (2013.01); *C08F 2/26* (2013.01); *C08G 18/0866* (2013.01); *C08G 18/6229* (2013.01); *C08G 18/6287* (2013.01); *C08G 18/73* (2013.01); *C09D 5/022* (2013.01); *C09D 133/14* (2013.01); *C09D 175/04* (2013.01); *C09D 175/14* (2013.01)

(58) Field of Classification Search
CPC ............ C08G 18/6291; C08G 18/0866; C08G 18/6229; C08G 18/6287; C08G 18/73; C08F 2/26; C09D 5/022; C09D 175/04; C09D 175/14; C09D 133/14
See application file for complete search history.

(56) References Cited

U.S. PATENT DOCUMENTS

| 5,663,272 A | 9/1997 | Slack et al. |
| 6,028,158 A | 2/2000 | Slack et al. |
| 6,130,286 A | 10/2000 | Thomas et al. |
| 2006/0047065 A1 | 3/2006 | Becker et al. |
| 2006/0155095 A1 | 7/2006 | Daussin et al. |
| 2009/0274846 A1 | 11/2009 | Wada et al. |
| 2015/0225596 A1 | 8/2015 | Kitagawa et al. |
| 2015/0322292 A1 | 11/2015 | Pierce et al. |

FOREIGN PATENT DOCUMENTS

| CA | 2577788 A1 | 4/2006 |
| CN | 1557892 A | 12/2004 |
| CN | 105061665 A | 11/2015 |
| CN | 105315735 A | 2/2016 |
| CN | 108047920 A | 5/2018 |

OTHER PUBLICATIONS

Hou, Xiaoyong Study on E-10 Modified High-Performance Acrylic Polyurethane Y 1-9 Coating, China Coating 10 M.2007(Oct. 7, 2007) No. 7 vol. 22 p. 24, col. left, paragraph 2 to p. 26, col. left, paragraph 1 and tables 1-4.

*Primary Examiner* — Patrick D Niland
(74) *Attorney, Agent, or Firm* — Karl E. Stauss; Cantor Colburn LLP

(57) ABSTRACT

A two-component polyurethane composition comprising a polyisocyanate and an emulsion polymer having greater than 2.2% of hydroxy groups in the emulsion polymer and comprising structural units of a polymerizable surfactant, a first hydroxy-functional monomer, an acid monomer and/or a salt thereof, an additional monoethylenically unsaturated nonionic monomer, and optionally a second hydroxy-functional alkyl (meth)acrylate; the two-component polyurethane composition providing improved alcohol resistance without compromising both acid and alkali resistance.

9 Claims, No Drawings

TWO-COMPONENT POLYURETHANE COMPOSITION

FIELD OF THE INVENTION

The present invention relates to a two-component polyurethane composition and a process of preparing the same.

INTRODUCTION

Conventional solvent-borne two-component polyurethane coating compositions can provide excellent appearance but usually contain high volatile organic compound (VOC) content. Two-component polyurethane coating compositions comprising conventional emulsion polymers and polyisocyanates significantly reduce the VOC content and have a reasonable cure speed. There is still room to further improve coatings' chemical resistance to meet industrial requirements for different applications. However, due to different characters of chemicals, it is challenging for coatings to provide satisfactory alcohol resistance while maintaining acid and alkali resistance. Furthermore, it is also desirable for coatings to provide sufficient methyl ethyl ketone (MEK) resistance. It would therefore be advantageous to provide a two-component polyurethane composition that provides improved alcohol resistance upon curing without compromising acid resistance, alkali resistance, and other properties such as MEK resistance, gloss, and hardness.

SUMMARY OF THE INVENTION

The present invention provides a two-component polyurethane composition, particularly suitable for coatings, comprising a polyisocyanate and an emulsion polymer. The emulsion polymer useful in the present invention containing greater than 2% by weight of hydroxy groups may comprise a novel combination of structural units of a polymerizable surfactant, a first hydroxy-functional monomer, an acid monomer and/or a salt thereof, and optionally a second hydroxy-functional alkyl (meth)acrylate. The two-component polyurethane composition of the present invention can provide coatings with improved alcohol resistance with rating of 4 or more without compromising acid resistance and alkali resistance. The two-component polyurethane composition may also provide coatings with good methyl ethyl ketone (MEK) resistance to sustain at least 30 double rubs. These properties may be measured according to the test methods described in the Examples section below.

In a first aspect, the present invention is a two-component polyurethane composition comprising an emulsion polymer and a polyisocyanate, wherein the emulsion polymer having a weight average molecular weight of 180,000 g/mol or less comprises, by weight based on the weight of the emulsion polymer, (a) 0.3% or more of structural units of a polymerizable surfactant, (b) greater than 25% of structural units of a first hydroxy-functional monomer of the following formula,

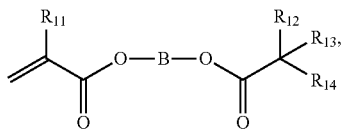

where $R_{11}$ is hydrogen or —$CH_3$; $R_{12}$, $R_{13}$, and $R_{14}$ are each independently an alkyl group; provided that $R_{12}$, $R_{13}$, and $R_{14}$ together contain from 3 to 20 carbon atoms; and B is

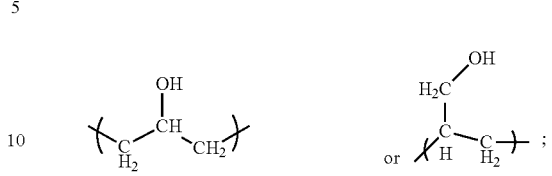

(c) from zero to 40% of structural units of a second hydroxy-functional alkyl (meth)acrylate;

(d) structural units of an acid monomer, a salt thereof, or mixtures thereof; and (e) structural units of an additional monoethylenically unsaturated nonionic monomer;

wherein the emulsion polymer comprises greater than 2.2% of hydroxy groups, by weight based on the weight of the emulsion polymer.

In a second aspect, the present invention is a process of preparing the two-component polyurethane composition of the first aspect. The process comprises comprising: admixing an emulsion polymer with a polyisocyanate, wherein the emulsion polymer having a weight average molecular weight of 180,000 g/mol or less comprises, by weight based on the weight of the emulsion polymer, (a) 0.3% or more of structural units of a polymerizable surfactant, (b) greater than 25% of structural units of a first hydroxy-functional monomer of the following formula,

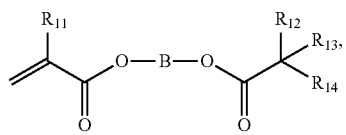

where $R_{11}$ is hydrogen or —$CH_3$; $R_{12}$, $R_{13}$, and $R_{14}$ are each independently an alkyl group; provided that $R_{12}$, $R_{13}$, and $R_{14}$ together contain from 3 to 20 carbon atoms; and B is

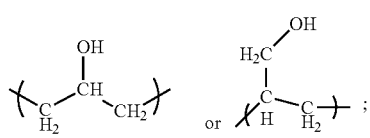

(c) from zero to 40% of structural units of a second hydroxy-functional alkyl (meth)acrylate;

(d) structural units of an acid monomer, a salt thereof, or mixtures thereof; and (e) structural units of an additional monoethylenically unsaturated nonionic monomer;

wherein the emulsion polymer comprises greater than 2.2% of hydroxy groups, by weight based on the weight of the emulsion polymer.

DETAILED DESCRIPTION OF THE INVENTION

"Aqueous" dispersion herein means that particles dispersed in an aqueous medium. By "aqueous medium" herein is meant water and from 0 to 30%, by weight based on the weight of the medium, of water-miscible compound(s) such as, for example, alcohols, glycols, glycol ethers, glycol esters, and the like.

"Structural units", also known as "polymerized units", of the named monomer, refers to the remnant of the monomer after polymerization, that is, polymerized monomer or the monomer in polymerized form. For example, a structural unit of methyl methacrylate is as illustrated:

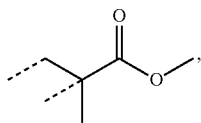

where the dotted lines represent the points of attachment of the structural unit to the polymer backbone.

The two-component polyurethane composition of the present invention typically comprises component A and component B, where the component A may comprise an emulsion polymer, and the component B may comprise one or more polyisocyanates.

The emulsion polymer useful in the present invention may comprise structural units of one or more polymerizable surfactants. Polymerizable surfactants refer to surfactants comprising at least one carbon-carbon double bond. "Structural units" or "polymerized units" of the named surfactant refers to the remnant of the surfactant after polymerization.

In some embodiments, the polymerizable surfactant has formula (I):

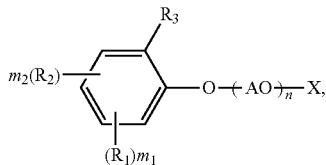

(I)

where $R_1$ is a phenyl group or a phenyl substituted alkyl group; m1 is from 1 to 4, preferably from 1 to 3; $R_2$ is an alkyl group or a substituted alkyl group; m2 is 0 or 1; $R_3$ is hydrogen; an alkyl group, preferably having from 1 to 20 carbon atoms; or —C($R_4$)=$CR_5R_6$, wherein $R_4$, $R_5$ and $R_6$ are each independently hydrogen or an alkyl group, preferably having 1 to 22 carbon atoms; A represents an alkylene group or a substituted alkylene group, preferably having 2 to 4 carbon atoms; n is an integer of from 1 to 100, from 2 to 20, or from 5 to 20; and X represents hydrogen or an anionic hydrophilic group selected from —$(CH_2)_a$—$SO_3M$, —$(CH_2)_b$—COOM, —$PO_3M_2$, —P(Z)$O_2M$, or —CO—$CH_2$—CH($SO_3M$)-COOM, wherein a and b are each independently an integer of from 0 to 4, Z represents a residual obtained by removing X from the general formula (I), and each M represents hydrogen, an alkali metal cation, an alkaline earth metal cation, $NH_4^+$, an aminium ion having an ethylenically unsaturated bond, an imidazolium ion having an ethylenically unsaturated bond, a pyridinium ion having an ethylenically unsaturated bond, a pyrrolidinium ion having an ethylenically unsaturated bond, or a piperidinium ion having an ethylenically unsaturated bond; provided that only one of $R_3$ and X contains an ethylenically unsaturated bond.

In formula (I), each $R_1$ may be the same or different, and preferably is independently a phenyl substituted alkyl group such as

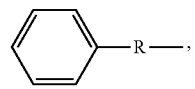

wherein R is an alkylene group having from 1 to 4 carbon atoms or from 2 to 3 carbon atoms, e.g., —$CH_2$—, —CH($CH_3$)—, or —C($CH_3$)$_2$—. More preferably, $R_1$ is

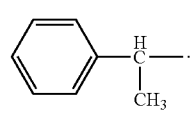

In formula (I), $R_3$ is preferably —CH=CH($CH_3$), and X is preferably —$SO_3M$, wherein M is an alkali metal cation, an alkaline earth metal cation, or $NH_4^+$. Specific examples of the polymerizable surfactant of formula (I) include the structure:

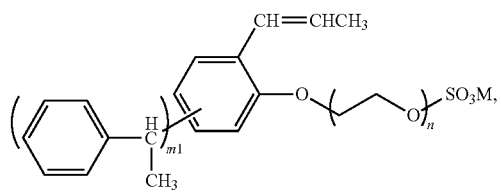

wherein m1 and n are as defined above, and M is $Li^+$, $Na^+$, $K^+$, or $NH_4^+$.

In some other embodiments, the polymerizable surfactant useful in the present invention comprises a compound of formula (II), its salts, or mixtures thereof:

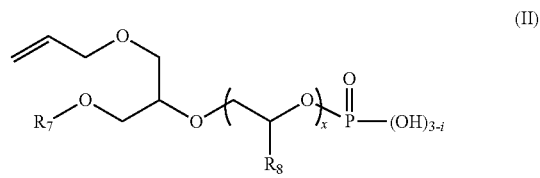

(II)

where $R_7$ is an alkyl group, preferably having from 1 to 20 carbon atoms, from 2 to 18 carbon atoms, or from 5 to 15 carbon atoms; $R_8$ is hydrogen, methyl, or propyl; x is from 1 to 100, from 2 to 60, from 2 to 40, or from 4 to 20; and i is 1 or 2.

In some further embodiments, the polymerizable surfactant useful in the present invention comprises a compound of formula (III), its salts, or mixtures thereof:

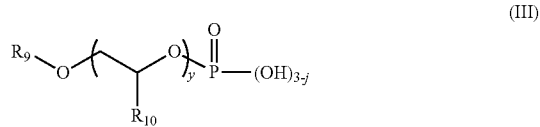

(III)

where $R_9$ is an alkenyl group containing at least one ethylenically unsaturated bond, preferably having from 3 to 24 carbon atoms, from 3 to 20 carbon atoms, or from 3 to 18 carbon atoms; $R_{10}$ is hydrogen, methyl, or propyl; y is from 1 to 100, from 2 to 60, from 2 to 40, or from 4 to 20; and j is 1 or 2.

Preferably, the polymerizable surfactant is selected from the group consisting of polymerizable phosphoric acid surfactants, polymerizable phosphate surfactants, polymerizable phosphonic acid surfactants, polymerizable phosphonate surfactants, or mixtures thereof. Suitable examples of commercially available polymerizable surfactants may include, for example, Maxemul 6112 surfactant available from Croda, LRP10 and PP-7025 surfactants available from Nanjing Qicheng, Hitenol AR-1025 surfactant available from Dai-ichi Kogyo Seiyaku Co., Ltd., or mixtures thereof. The emulsion polymer may comprise, by weight based on the weight of the emulsion polymer, 0.3% or more of structural units of the polymerizable surfactant, for example, 0.4% or more, 0.5% or more, 0.55% or more, 0.6% or more, 0.65% or more, 0.7% or more, 0.75% or more, 0.8% or more, 0.85% or more, 0.9% or more, 0.95% or more, 1.0% or more, and at the same time, 3% or less, 2.8% or less, 2.7% or less, 2.6% or less, 2.5% or less, 2.4% or less, 2.3% or less, 2.2% or less, 2.1% or less, or even 2% or less. "Weight of the emulsion polymer" refers to the dry weight of the emulsion polymer.

The emulsion polymer useful in the present invention is a hydroxyl group-containing polymer. The emulsion polymer may comprise structural units of a first hydroxy-functional monomer of formula (IV) as follows,

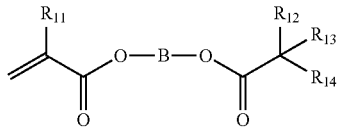

(IV)

where, $R_{11}$ is hydrogen or —$CH_3$; $R_{12}$, $R_{13}$, and $R_{10}$ are each independently an alkyl group; provided that $R_{12}$, $R_{13}$, and $R_{10}$ together contain from 3 to 20 carbon atom; preferably from 3 to 18 carbon atoms, from 3 to 11 carbon atoms, or from 7 to 9 carbon atoms; and B is

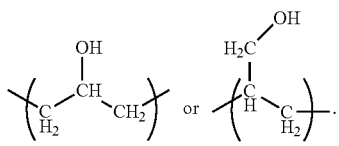

Preferably, $R_{12}$ is methyl, ethyl, propyl, or butyl.

The first hydroxy-functional monomers useful in the present invention can be reaction products of monoepoxyesters and one or more acid monomers. These monoepoxyesters are preferably glycidyl esters derived from aliphatic saturated monocarboxylic acids with a tertiary or quaternary carbon atom in the alpha position. It is preferred to use glycidyl esters of saturated alpha, alpha-dialkylalkanemonocarboxylic acids with 5 to 13 carbon atoms in the acid molecule, preferably, 9 to 11 carbon atoms in the acid molecule. Examples of glycidyl esters are the glycidyl esters derived from versatic acid (also as "neodecanoic acid") and the glycidyl esters derived from pivalic acid. Suitable acid monomers may include, for example, (meth)acrylic acid, crotonic acid, isocrotonic acid, maleic acid, fumaric acid, or mixture thereof. Preferred acid monomers are (meth)acrylic acid. Preferred first hydroxy-functional monomers include reaction products of glycidyl ester derived from versatic acid and (meth)acrylic acid.

The emulsion polymer may comprise, by weight based on the weight of the emulsion polymer, greater than 25% of structural units of the first hydroxy-functional monomer, for example, 28% or more, 30% or more, 31% or more, 32% or more, 33% or more, 34% or more, 35% or more, 37% or more, 38% or more, 39% or more, 40% or more, 41% or more, 42% or more, 43% or more, 44% or more, or even 45% or more, at the same time, 75% or less, 72% or less, 70% or less, 68% or less, 65% or less, 62% or less, 60% or less, 58% or less, 55% or less, 52% or less, or even 50% or less.

The emulsion polymer may also comprise structural units of a second hydroxy-functional alkyl (meth)acrylate. The alkyl group in the second hydroxy-functional alkyl (meth)acrylate may contain carbon atoms in the range of from 2 to 12, from 2 to 10, from 2 to 8, or from 2 to 6. Examples of suitable second hydroxy-functional alkyl (meth)acrylates include hydroxyethyl (meth)acrylates such as 2-hydroxyethyl acrylate and 2-hydroxyethyl methacrylate; hydroxypropyl (meth)acrylates such as 2-hydroxypropylacrylate, 2-hydroxypropyl methacrylate, 3-hydroxypropyl acrylate, and 3-hydroxypropyl methacrylate; hydroxybutyl (meth)acrylates such as 3-hydroxybutyl acrylate, 3-hydroxybutyl methacrylate, 4-hydroxybutyl acrylate, and 4-hydroxybutyl methacrylate; 6-hydroxyhexyl acrylate; 6-hydroxyhexylmethacrylate; 3-hydroxy-2-ethylhexyl acrylate; 3-hydroxy-2-ethylhexyl methacrylate; or mixtures thereof. Preferred hydroxy-functional alkyl (meth)acrylates include 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, or mixtures thereof. The emulsion polymer may comprise, by weight based on the weight of the emulsion polymer, structural units of the hydroxy-functional alkyl (meth)acrylate in an amount of from zero to 40%, for example, 0.5% or more, 1% or more, 1.5% or more, 2% or more, 2.5% or more, 3% or more, 3.5% or more, or even 4% or more, and at the same time, 35% or less, 30% or less, 25% or less, 20% or less, 15% or less, 10% or less, 9% or less, 8% or less, or even 5% or less.

Structural units of all of the hydroxy-functional monomers including the first hydroxy-functional monomer and the second hydroxy-functional alkyl (meth)acrylate may be present in the emulsion polymer in a combined amount to afford a hydroxy group content (OH %) of the emulsion polymer more than 2.2%, for example, 2.25% or more, 2.3% or more, 2.35% or more, 2.4% or more, or even 2.5% or more, and at the same time, 5.5% or less, 5% or less, 4.5% or less, 4% or less, or even 3.5% or less. The OH % values of an emulsion polymer can be calculated by the equation:

$$OH\% = (W_{(OH1)}/M_{(OH1)} + W_{(OH2)}/M_{(OH2)}) * 17$$

where $W_{(OH1)}$ is the weight percent of structural units of a first hydroxy-functional monomer based on the weight of the emulsion polymer, $M_{(OH1)}$ is the molecular weight of the first hydroxy-functional monomer, $W_{(OH2)}$ is the weight percent of structural units of a second hydroxy-functional monomer based on the weight of the emulsion polymer, and $M_{(OH2)}$ is the molecular weight of the second hydroxy-functional monomer.

The emulsion polymer useful in the present invention may further comprise structural units of one or more acid monomers, salts thereof, or mixtures thereof, such as carboxylic acid monomers, sulfonic acid monomers, phosphorous-containing acid monomers, salts thereof, or mixtures thereof. Examples of suitable phosphorous-containing acid monomers and salts thereof include phosphoalkyl (meth)acrylates such as phosphoethyl (meth)acrylate, phosphopropyl (meth)acrylate, phosphobutyl (meth)acrylate, salts thereof, and mixtures thereof; $CH_2=C(R_{15})-C(O)-O-(R_{16}O)_q-P(O)(OH)_2$, wherein $R_{15}$=H or $CH_3$, $R_{16}$=alkylene, such as an ethylene group, a propylene group, a butylene group, or a combination thereof; and q=1-20, such as SIPOMER PAM-100, SIPOMER PAM-200, SIPOMER PAM-300, SIPOMER PAM-600 and SIPOMER PAM-4000 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, and mixtures thereof. Preferred phosphorus-containing acid monomers and salts thereof are selected from the group consisting of phosphoethyl (meth)acrylate, phosphopropyl (meth)acrylate, phosphobutyl (meth)acrylate, allyl ether phosphate, salts thereof, or mixtures thereof; more preferably, phosphoethyl methacrylate (PEM). The carboxylic acid monomers can be α, β-ethylenically unsaturated carboxylic acids, monomers bearing an acid-forming group which yields or is subsequently convertible to, such an acid group (such as anhydride, (meth)acrylic anhydride, or maleic anhydride); and mixtures thereof. Specific examples of carboxylic acid monomers include acrylic acid, methacrylic acid, maleic acid, itaconic acid, crotonic acid, fumaric acid, 2-carboxyethyl acrylate, or mixtures thereof. The sulfonic acid monomers and salts thereof may include sodium vinyl sulfonate (SVS), sodium styrene sulfonate (SSS), acrylamido-methylpropane sulfonate (AMPS); or mixtures thereof. The emulsion polymer may comprise structural units of the acid monomers and salts thereof in an amount of 0.1% or more, 0.5% or more, 0.8% or more, 1.0% or more, 1.2% or more, 1.4% or more, 1.5% or more, 1.6% or more, or even 1.8% or more, and at the same time, 10% or less, 8% or less, 6% or less, 5% or less, 4.5% or less, 4% or less, 3.5% or less, 3% or less, or even 2.5% or less, by weight based on the weight of the emulsion polymer.

The emulsion polymer useful in the present invention may also comprise structural units of one or more ethylenically unsaturated monomers carrying at least one of functional groups selected from an amide, acetoacetate, carbonyl, ureido, silane, or amino group, or combinations thereof (hereinafter "functional-group-containing monomer"), which are different from the monomers describe above. Suitable functional-group-containing monomers may include, for example, amino-functional monomers such as dimethylaminoethyl methacrylate, dimethylaminoethyl acrylate, dimethylaminopropyl methacrylate, dimethylaminopropyl acrylate; monomers bearing acetoacetate-functional groups such as acetoacetoxyethyl methacrylate (AAEM), acetoacetoxyethyl acrylate, acetoacetoxypropyl methacrylate, acetoacetoxypropyl acrylate, allyl acetoacetate, acetoacetoxybutyl methacrylate, acetoacetoxybutyl methacrylate, acetoacetamidoethyl methacrylate, acetoacetamidoethyl acrylate; monomers bearing carbonyl-containing groups such as diacetone acrylamide (DAAM), diacetone methacrylamide; monomers bearing amide-functional groups such as acrylamide and methacrylamide; vinyltri-alkoxysilanes such as vinyltrimethoxysilane, vinyltriethoxysilane, vinyltris(2-methoxyethoxy)silane, vinyldimethylethoxysilane vinylmethyldiethoxysilane or (meth)acryloxyalkyltrialkoxysilanes such as (meth)acryloxyethyltrimethoxysilane and (meth)acryloxypropyltrimethoxysilane; and mixtures thereof. The emulsion polymer may comprise, by weight based on the weight of the emulsion polymer, from zero to 10% of structural units of the functional-group-containing monomer, for example, 0.1% or more, 0.3% or more, 0.5% or more, 0.8% or more, or even 1% or more, and at the same time, 8% or less, 5% or less, 3% or less, 2% or less, 1.9% or less, 1.8% or less, 1.6% or less, or even 1.5% or less.

The emulsion polymer useful in the present invention may also comprise structural units of one or more additional monoethylenically unsaturated nonionic monomers that are different from the monomers described above. "Nonionic monomers" herein refers to monomers that do not bear an ionic charge between pH=1-14. The additional monoethylenically unsaturated nonionic monomers may include vinyl aromatic monomers, alkyl (meth)acrylates, acrylonitrile, and mixtures thereof. Suitable vinyl aromatic monomers may include, for example, styrene; substituted styrene such as methylstyrene, alpha-methylstyrene, trans-beta-methylstyrene, 2, 4-dimethylstyrene, ethylstyrene, butylstryene, and p-methoxy styrene; o-, m-, and p-methoxy styrene; and p-trifluoromethylstyrene; or mixtures thereof. The alkyl (meth)acrylates can be $C_1$-$C_{20}$-alkyl, $C_1$-$C_{18}$-alkyl, $C_1$-$C_{12}$-alkyl, or $C_1$-$C_4$-alkyl (meth)acrylates. Specific examples of alkyl (meth)acrylates include methyl acrylate, methyl methacrylate, ethyl acrylate, ethyl methacrylate, butyl acrylate, butyl methacrylate, tert-butyl acrylate, iso-butyl acrylate, iso-butyl methacrylate, 2-ethylhexyl acrylate, nonyl acrylate, decyl acrylate, lauryl acrylate, cyclohexyl methacrylate, cyclohexyl acrylate, tert-butyl cyclohexyl methacrylate, trimethylcyclohexyl methacrylate, isobornyl methacrylate, isobornyl acrylate, tetrahydrofuran methacrylate, dicyclopentadienyl acrylate, dicyclopentadienyl methacrylate, and combinations thereof. The additional monoethylenically unsaturated nonionic monomers preferably include styrene in combination of one or more alkyl (meth)acrylates. Preferred additional monoethylenically unsaturated nonionic monomers are styrene, methyl methacrylate, 2-ethylhexyl acrylate, butyl acrylate, or mixtures thereof. The emulsion polymer may comprise, by weight based on the weight of the emulsion polymer, 25% or more, 30% or more, 35% or more, 37% or more, 40% or more, 45% or more, or even 48% or more, and at the same times, 74.9% or less, 74.5% or less, 72% or less, 70% or less, 69.5% or less, 68% or less, or even 65% or less of structural units of the additional monoethylenically unsaturated nonionic monomer.

The emulsion polymer useful in the present invention may further comprise structural units of one or more multiethylenically unsaturated monomers including di-, tri-, tetra-, or higher multifunctional ethylenically unsaturated monomers. Examples of suitable multiethylenically unsaturated monomers include butadiene, allyl (meth)acrylate, divinyl benzene, ethylene glycol dimethacrylate, butylene glycol dimethacrylate, and mixtures thereof. The emulsion polymer may comprise, by weight based on the weight of the emulsion polymer, from zero to 5% of structural units of the multiethylenically unsaturated monomer, for example, 3% or less, 2% or less, 1% or less, 0.5% or less, or even zero.

The emulsion polymer useful in the present invention may have a weight average molecular weight of 180,000 g/mol or less, for example, from 8,000 g/mol to 180,000 g/mol, from 10,000 g/mol to 160,000 g/mol, from 12,000 g/mol to 140,000 g/mol, from 15,000 g/mol to 120,000 g/mol, from 18,000 g/mol to 100,000 g/mol, from 20,000 g/mol to 90,000 g/mol, from 25,000 g/mol to 80,000 g/mol, from 30,000 g/mol to 70,000 g/mol, or from 30,000 g/mol to 60,000 g/mol. Weight average molecular weight of the emulsion polymer can be determined by gel permeation chromatography (GPC) as described in the Examples section below.

The emulsion polymer useful in the present invention is typically present in the form of an aqueous dispersion in an amount of from 20% to 70%, from 30% to 55%, from 35% to 50%, or from 40% to 45%, by dry or solids weight based on the total weight of the aqueous dispersion. The emulsion polymer particles may have a particle size of from 30 to 500 nanometers (nm), for example, from 50 nm to 400 nm, from 60 nm to 300 nm, from 70 nm to 200 nm, or from 80 nm to 150 nm. The particle size may be measured by a Brookhaven BI-90 Plus Particle Size Analyzer as described in the Examples section below.

Types and levels of the monomers described above may be chosen to provide the obtained emulsion polymer with a glass transition temperature (Tg) suitable for different applications. The emulsion polymer may have a measured Tg in the range of from 15 to 85° C., from 20 to 80° C., from 25 to 75° C., or from 30 to 70° C. By "measured Tg" as used herein, is meant the glass transition temperature as determined by differential scanning calorimetry (DSC) according to the test method described in the Examples section below.

The emulsion polymer useful in the present invention may be prepared by emulsion polymerization, of the monomers and the polymerizable surfactant described above, in an aqueous medium. Monomers may be added neat or as an emulsion in water; or added in one or more additions or continuously, linearly or nonlinearly, over the reaction period of preparing the emulsion polymer. Total weight concentration of the monomers described above for preparing the emulsion polymer may be equal to 100%. Total weight concentration of the structural units of the monomers and the polymerizable phosphate surfactant in the emulsion polymer may be equal to 100%. In addition to the polymerizable surfactant, one or more additional surfactants that are different from the polymerizable surfactants may be added prior to or during the polymerization of the monomers, or combinations thereof. Examples of suitable additional surfactants include alkali metal or ammonium salts of alkyl, aryl, or alkylaryl sulfates, sulfonates or phosphates; alkyl sulfonic acids; sulfosuccinate salts; fatty acids; ethoxylated alcohols or phenols; and mixtures thereof. A portion of the additional surfactant can also be added after the polymerization. These additional surfactants may be used in an amount of zero to 5%, from 0.1% to 2.7%, from 0.3% to 2.5%, from 0.4% to 2%, from 0.5% to 1.8%, or from 0.6% to 1.6%, by weight based on the total weight of monomers. Temperature suitable for polymerization of the monomers may be lower than 100° C., in the range of from 10 to 95° C., or in the range of from 50 to 92° C. Single stage or multistage emulsion polymerization may be used.

Free radical initiators may be used in the polymerization process. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of the monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

One or more chain transfer agents may be used in the polymerization process to control the molecular weight of the emulsion polymer. Examples of suitable chain transfer agents include 3-mercaptopropionic acid, methyl 3-mercaptopropionate, butyl 3-mercaptopropionate, n-dodecyl mercaptan, n-hexadecanethiol, tert-dodecyl mercaptan, n-octadecanethiol, benzenethiol, azelaic alkyl mercaptan, hydroxy group containing mercaptans such as hydroxyethyl mercaptan, mercaptopropionic acid, and mixtures thereof. The chain transfer agent may be used in an amount of from 0.05% to 10%, from 0.1% to 8%, from 0.2% to 5%, from 0.3% to 4%, from 0.4% to 3.5%, from 0.5% to 3.0%, from 0.6% to 2.6%, from 0.8% to 2.5%, from 1.0% to 2.4%, from 1.2% to 2.2%, or from 1.4% to 2.0%, by weight based on the total weight of the monomers.

After completing the polymerization process, the obtained aqueous dispersion may be neutralized by one or more bases to a pH value, for example, from 5 to 10, from 6 to 9, from 6.4 to 8.5, or from 6.6 to 8.0. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, 2-amino-2-methyl-1-propanol, diethyl amine, dimethyl amine, di-npropylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine; aluminum hydroxide; or mixtures thereof.

The polyurethane composition of the present invention may also comprise one or more polyols having two or more hydroxyl groups per molecule, typically in the component A. Polyols useful in the present application may include polyether diols, polyester diols, polycarbonate polyols, multi-functional polyols, or mixtures thereof. The polyols may be selected from polyether polyols, polyester polyols, polycarbonate polyols, or mixtures thereof. The polyether polyols useful the present application may contain a —C—O—C— group. They can be obtained by reacting starting compounds that contain reactive hydrogen atoms such as water or diols, with alkylene oxides such as ethylene oxide, propylene oxide, butylene oxide, styrene oxide, tetrahydrofuran, epichlorohydrin, or mixtures thereof. Preferred polyether polyols include poly(propylene glycol) with a molecular weight of from 400 to 3,000, polytetrahydrofuran and copolymers of poly(ethylene glycol) and poly(propylene glycol). The diols useful in the present application may include alkylene glycols, preferably ethylene glycol, diethylene glycol and butylene glycol. The polyester polyols useful in preparing the polyurethane are typically esterification products prepared by the reaction of organic polycarboxylic acids or their anhydrides with a stoichiometric excess of a diol(s). Examples of suitable polyester polyols useful in preparing the polyurethane include poly(glycol adipate), poly(ethylene terephthalate) polyols, polycaprolactone polyols, alkyd polyols, orthophthalic polyols, sulfonated and phosphonated polyols, and the mixture thereof. The diols useful in preparing the polyester polyols include those described above for preparing the polyether polyols. Suitable carboxylic acids useful in preparing the polyester polyols may include dicarboxylic acids, tricarboxylic acids and anhydrides, such as maleic acid, maleic anhydride, succinic acid, glutaric acid, glutaric anhydride, adipic acid, suberic acid, pimelic acid, azelaic acid, sebacic acid, chlorendic acid, 1,2,4-butane-tricarboxylic acid, phthalic acid, the isomers of phthalic acid, phthalic anhydride, fumaric acid, dimeric fatty acids such as oleic acid, and the like, or mixtures thereof. Preferred polycarboxylic acids useful in preparing the polyester polyols include aliphatic and aromatic dibasic acids.

Suitable polyols may comprise any cycloaliphatic polyol having a molecular weight of from 100 to 500 and containing one or more 4 to 7 member aliphatic ring, or any oligomeric diol or polyol made from a cycloaliphatic polyol having a molecular weight of from 100 to 500 and comprising at least 30% by weight of cycloaliphatic diol and/or polyol and having a weight average molecular weight of from 200 to 3,000 g/mol, from 200 to 2,000 g/mol, or from 200 to 1,000 g/mol. Examples of such polyols include cyclohexanedimethanol (CHDM), especially 1,3 CHDM, 1,4 CHDM, mixtures thereof, dianhydro-d-glucitol, which has two 5 membered rings, each containing an oxygen atom, 4,8-Bis(hydroxymethyl)tricyclo [5.2.1.02,6] decane, and 2,2,4,4-tetramethyl cyclobutanediol, containing a 4 membered ring.

Oligomeric polyols useful in the present invention may include any oligomers comprising the condensation reaction product of at least 30% preferably, at least 40%, by weight based on the total weight of reactants used to make the oligomer, of, any cycloaliphatic polyol having a molecular weight of from 100 to 500 g/mol and containing one or more 4 to 7 member aliphatic ring. These oligomeric polyols may include, for example, oligo- or polyesters, short chain alkyds, oligo- or polycarbonates, oligo- or polyethers and oligo- or polylactones having the desired low weight average molecular weight, for example, from 200 to 3,000 g/mol, from 200 to 2,000 g/mol, or from 200 to 1,000 g/mol. Such oligomers may be made by conventional means, such as by bulk polymerization. For example, polyesters may be made, e.g. from diacids or difunctional anhydrides or their salts cycloaliphatic diols or triols having one or more 4 to 7 member aliphatic rings. Likewise, other oligomers may be formed by reacting any cycloaliphatic polyol having a molecular weight of from 100 to 500 and containing one or more 4 to 7 member aliphatic ring in the presence of lactone reactants, e.g. caprolactone, to make polylactone polyols, or in the presence of carbonate reactants, e.g. trimethylene carbonate, to make polycarbonate polyols. An example of a suitable polyester polyol was made by condensing 2 CHDM molecules and 1 oxalic acid molecule, for which the polyol content was calculated as 76.2% by weight. Commercially available polyols may include, for example, K-Flex 188 and K-Flex A308 polyester polyols from King Industries, Inc. (Norwalk, Conn.); UNOXOL™ diol, a mixture of 1,3 CHDM and 1,4 CHDM (The Dow Chemical Company, UNOXOL is a trademark of The Dow Chemical Company); and Polysorb P dianhydro-d-glucitol (Roquette, Lestrem, FR). As used herein the term "molecular weight" when referring to a cycloaliphatic polyol refers to the mass of one mole of that cycloaliphatic polyol in grams. As used herein, the term "molecular weight" of other polyols is a weight average molecular weight of a sample of that polyols as determined by GPC of the sample in tetrahydrofuran solvent as against a polystyrene molecular weight standard as calibration standard. EasiCal PS-2 standard (Agilent Technologies, Inc, Santa Clara, Calif.) against a polystyrene standard.

The polyols included in the polyurethane composition are either in neat form (for water-soluble polyols), or for less water-soluble polyols, are preferably micronized and stabilized with a stabilizing amount of a surfactant, preferably at a concentration in the range of about 0.5 to 5%, by weight based on total weight of the diols or polyols. Nonionic surfactants are preferred and may include those described above in the preparation of the emulsion polymer section above. These polyols may be present in an amount of from zero to 20%, from 0.1% to 15%, or from 0.2% to 10%, by weight based on the total solids weight of polyols and the emulsion polymer.

The polyurethane composition of the present invention further comprises one or more polyisocyanates useful as crosslinkers, preferably water-dispersible polyisocyanates. The polyisocyanates useful in the present invention may include any isocyanate molecule having 2 or more isocyanate groups, which preferably can be dispersed in or dissolved in water at room temperature (23±2° C.). Such polyisocyanates can be aliphatic, alicyclic, aromatic or mixtures thereof. The polyisocyanate may have an average functionality of >2 or from 2.5 to 10. Examples of suitable polyisocyanates include aliphatic diisocyanates, as well as dimers and trimers thereof, such as, for example, $C_2$-$C_8$ alkylene diisocyanates, such as tetramethylene diisocyanate and hexamethylene diisocyanate (HDI), 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate; alicyclic diisocyanates, as well as dimers and trimers thereof, such as, for example, isophorone diisocyanate (IPDI) and dicyclohexyl methane diisocyanate (HMDI), 1,4-cyclohexane diisocyanate, and 1,3-bis-(isocyanatomethyl)cyclohexane; aromatic diisocyanates, as well as dimers and trimers thereof, such as, for example, toluene diisocyanate (TDI), and diphenyl methane diisocyanate (MDI). Preferably, the polyisocyanate comprises aliphatic polyisocyanates. More preferably, the polyisocyanates are hexamethylene diisocyanate homopolymers, hexamethylene diisocyanate adducts, isophorone diisocyanate homopolymers, isophorone diisocyanate adducts, or mixtures thereof. The trimers (or isocyanurates) in the polyisocyanate may be prepared by methods known in the art, for example, as disclosed in U.S. patent publication no. 2006/0155095A1, to Daussin et al., by trimerizing an alicyclic diisocyanate (e.g. isophorone diisocyanate) in the presence of one or more trimerization catalyst, such as, for example, a tertiary amine or phosphine or a heterogeneous catalyst, and, if desired, in the presence of solvents and/or assistants, such as co-catalysts, expediently at elevated temperature, until the desired isocyanate (NCO) content has been reached, and then deactivating the catalyst using inorganic and organic acids, the corresponding acid-halides and alkylating agents and, preferably, heating. Isocyanurate compositions containing isocyanurates from aliphatic diisocyanates may likewise be formed by cyclizing aliphatic diisocyanates in the presence of one or more trimerization catalyst and then deactivating the catalyst. Any of the isocyanurates can be further modified by conventional methods to contain urethane, urea, imino-s-triazine, uretonimine or carbodiimide moieties. Other suitable polyisocyanates may include, for example, polyether modified polyisocyanates such as polyalkoxylated isocyanurates having two isocyanate groups.

The polyisocyanate useful in the present invention may include one or more polyisocyanate prepolymers, which may be formed by reaction of bis(isocyanotomethyl)cyclohexane and/or another aliphatic diisocyanate with a monol, diol, diamine, or monoamine, which is then modified by the reaction of additional isocyanate to form allophanate or biuret modified prepolymers. Such prepolymers may further comprise a polyalkoxy or polyether chain. Alternatively, such prepolymers can then be mixed with a trimerization catalyst giving an allophanate or biuret modified polyisocyanate isocyanurate compositions. Preparation of such allophanate or biuret prepolymers, followed by trimerization, is known in the art, see for example, U.S. Pat. Nos. 5,663,272 and 6,028,158. Still further, suitable polyisocyanates may be modified by an aminosulfonic acid.

The polyurethane composition of the present invention may comprise equivalent ratios of the total number of isocyanate group equivalents in the polyisocyanates, which may contain several different polyisocyanates, to the total number of hydroxyl group equivalents in the emulsion polymer and optionally, polyols, in the range of, for example, from 0.7:1 to 4:1, from 0.8:1 to 3.5:1, from 0.8:1 to 3:1, from 0.9:1 to 2.5:1, from 0.9:1 to 2:1, from 1:1 to 1.7:1, or from 1.3:1 to 1.5:1.

The polyurethane composition of the present invention may optionally comprise one or more additional surfactants as described above, which may be introduced during the polymerization of the emulsion polymer, or post added in the preparation of the polyurethane composition. The additional surfactant may be present, by weight based on the weight of the emulsion polymer, in an amount of from zero to 5%, from 0.1% to 2.7%, from 0.3% to 2.5%, from 0.4% to 2%, from 0.5% to 1.8%, or from 0.6% to 1.6%.

The polyurethane composition of the present invention may further comprise one or more catalyst to enhance curing. The catalyst can be any suitable catalyst for two-component waterborne polyurethane composition. Examples include metal based catalysts such as tin-, bismuth-, zinc-, aluminum-, zirconium-containing catalysts or tertiary amine catalysts including aliphatic and cyclo-aliphatic tertiary amine catalysts which are mono-, di- or tri-amines, and mixtures thereof. Examples of suitable metal based catalysts may include, for example, dibutyltin dilaurate, dibutyltin mercaptide, dibutyltin sulfide, dimethyltin mercaptide, dibutyltin mercaptoester, zirconium dionate, Al dionate, bismuth neodecanoate, and zinc amine compounds. Tertiary amine catalysts may include, for example, triethylene diamine, triethylene amine, 1,4-diazabicyclo[2.2.2]octane, 6-(dibutylamino)-1,8-diazabicyclo[5.4.0]undec-7-ene, dimethyl cyclohexyl amine and etc. The catalyst may be present in an amount of from 0.01% to 2.5% or from 0.1% to 1.0%, by weight based on the total polyisocyanate and hydroxy group-containing component (e.g., the emulsion polymer, and optionally the polyols) solids.

The polyurethane composition of the present invention may further comprise one or more pigments. As used herein, the term "pigment" refers to a particulate inorganic material which is capable of materially contributing to the opacity or hiding capability of a coating. Such materials typically have a refractive index greater than 1.8. Examples of suitable pigments include titanium dioxide ($TiO_2$), zinc oxide, zinc sulfide, iron oxide, barium sulfate, barium carbonate, or mixtures thereof. Preferred pigment is $TiO_2$. The polyurethane composition may also comprise one or more extenders. The term "extender" refers to a particulate inorganic material having a refractive index of less than or equal to 1.8 and greater than 1.3. Examples of suitable extenders include calcium carbonate, aluminium oxide ($Al_2O_3$), clay, calcium sulfate, aluminosilicate, silicate, zeolite, mica, diatomaceous earth, solid or hollow glass, ceramic bead, and opaque polymers such as ROPAQUE™ Ultra E available from The Dow Chemical Company (ROPAQUE is a trademark of The Dow Chemical Company), or mixtures thereof. The polyurethane composition may have a pigment volume concentration (PVC) of from zero to 75%, from 5% to 50%, or from 10% to 30%. PVC may be determined according to the following equation:

$$PVC = \frac{\text{Volume of Pigment and extender}}{\text{Dry volume of the coating composition}} \times 100\%.$$

The polyurethane composition of the present invention may further comprise one or more matting agents, such as, a silica matting agent, a polyurea matting agent, silicone matting agent, or mixtures thereof. Suitable commercially available matting agents include, for example, Acematt TS-100, 3300 and OK 520 silica matting agents both available from Evonik, Deuteron MK polyurea matting agent available from Deuteron, Syloid Silica 7000 matting agent available from Grace Davison, DOWSIL™ IE3301 matting agent available from The Dow Chemical Company (DOWSIL is a trademark of The Dow Chemical Company), or mixtures thereof.

The polyurethane composition of the present invention may further comprise conventional additives such as, for example, colorants, light stabilizers, ultraviolet (UV) absorbing compounds, leveling agents, wetting agents, dispersants, anti-scratch additives, coalescents, neutralizers, defoamers, or rheology modifiers. These additives may be present in an amount of from zero to 20%, from 1 to 10%, by weight based on the weight of the polyurethane composition.

The polyurethane composition of the present invention may be prepared with techniques known in the art. A process for preparing the polyurethane composition typically comprises mixing the component A comprising the emulsion polymer, typically in an aqueous dispersion, and optionally, the polyols, pigments, and other additives, with the component B comprising the polyisocyanate immediately before application. Curing temperatures for the polyurethane composition may be varied depending on the substrate, for example, at temperatures ranging from 4 to 150° C., preferably, from room temperature to 80° C. Examples of suitable substrates include concrete, cementious substrates, wood, metals, stones, asphalt, plastics, elastomeric substrates, glass or fabrics.

The polyurethane composition of the present invention is useful for producing coatings, with or without a pigment or an extender, an adhesive, a sealant, a primer, or a caulk composition. The polyurethane composition can provide coatings made therefrom with a hardness of F or harder. The polyurethane composition may also provide coatings with satisfactory chemical resistance properties to afford alcohol resistance, acid resistance, and alkali resistance all with rating of at least 4. The coatings may also have good MEK resistance to sustain at least 30 double rubs, preferably more than 50 double rubs. All these properties can be measured according to the test methods described in the Examples section below.

The present invention further provides polyurethane coatings made from the two-component polyurethane composition on any of the substrates mentioned above. Such coatings can be multilayer coatings over a primer layer and, optionally, a basecoat or color coat. The coatings can be architecture coatings, general industrial finish coatings, marine and protective coatings, automotive coatings, auto refinish coatings, plastic coatings, wood coatings, coil coatings, and civil engineering coatings.

EXAMPLES

Some embodiments of the invention will now be described in the following Examples, wherein all parts and percentages are by weight unless otherwise specified.

Styrene (ST), methacrylic acid (MAA), butyl acrylate (BA), methyl methacrylate (MMA), hydroxyethyl methacrylate (HEMA), n-Dodecyl mercaptan (n-DDM), and ammonia persulfate (APS) are all available from Sinoreagent Group.

ADDAPT PolySurF ACE, available from ADDAPT Chemicals BV, is an acrylic acid adduct of the epoxy ester of versatic Acid.

Phosphoethyl methacrylate (PEM) is available from Solvay.

Maxemul 6112 surfactant (ME 6112), available from Croda, is a reactive surfactant with modified alcohol ether phosphate ammonium salt.

LRP-10 surfactant, available from Nanjing Qicheng New Material Co., Ltd., is a reactive phosphate surfactant.

REASOAP PP-7025 surfactant, available from Nanjing Qicheng New Material Co., Ltd., is a reactive phosphate surfactant with the structure of:

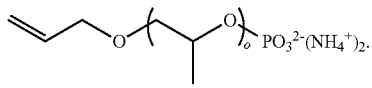

Hitenol AR-1025 surfactant, available from Dai-ichi Kogyo Seiyaku Co., Ltd., is a reactive surfactant with the structure of:

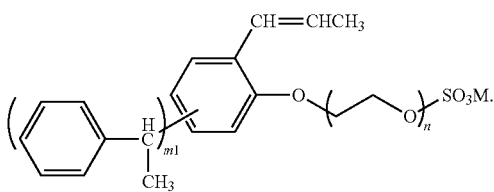

Disponil FES 993 surfactant, available from BASF, is a fatty alcohol polyglycol ether sulphate, sodium salt.

Aquolin 268 water dispersible HDI isocyanate (NCO content: 20.5%), available from Wanhua Chemical Company (China), is used as a curing agent.

BYK-346 wetting agent and BYK-028 defoamer are both available from BYK.

Acematt 3300 matting agent is available from Evonik.

DOWANOL™ DPnB Dipropylene glycol mono butyl ether coalescent and ACRYSOL™ RM-845 hydrophobically modified ethylene oxide urethane (HEUR) rheology modifier are both available from The Dow Chemical Company (DOWANOL and ACRYSOL are trademarks of The Dow Chemical Company).

The following standard analytical equipment, test methods and synthesis process are used in the Examples.

Particle Size Measurement

The particle size of polymer particles in an emulsion was measured by using Brookhaven BI-90 Plus Particle Size Analyzer, which employs the technique of photon correlation spectroscopy (light scatter of sample particles). This method involved diluting 2 drops of an aqueous dispersion to be tested in 20 mL of 0.01 M sodium chloride (NaCl) solution, and further diluting the resultant mixture in a sample cuvette to achieve a desired count rate (K) (e.g., K ranging from 250 to 500 counts/sec for diameter in the range of 10-300 nm). Then the particle size of the aqueous polymer dispersion was measured and reported as a Z-average diameter by intensity.

Tg Measurement

Tg was measured by DSC. A 5-10 milligram (mg) sample was analyzed in a sealed aluminum pan on a TA Instrument DSC Q2000 fitted with an auto-sampler under a nitrogen ($N_2$) atmosphere. Tg measurement by DSC was with three cycles including, from −40 to 180° C., 10° C./min ($1^{st}$ cycle, then hold for 5 minutes to erase thermal history of the sample), from 180 to −40° C., 10° C./min ($2^{nd}$ cycle), and from −40 to 180° C., 10° C./min ($3^{rd}$ cycle). The measured Tg was obtained from the $3^{rd}$ cycle by taking the mid-point in the heat flow versus temperature transition as the Tg value.

GPC Analysis

GPC analysis of an emulsion polymer was performed generally by Agilent 1200. A sample was dissolved in tetrahydrofuran (THF)/formic acid (FA) (5%) with a concentration of 2 mg/mL and then filtered through 0.45 μm polytetrafluoroethylene (PTFE) filter prior to GPC analysis. The GPC analysis was conducted using the following conditions:

Column: Two Mixed B columns (7.8 mm (millimeter)× 300 mm) in tandem; column temperature: 35° C.; mobile phase: THF/FA (5%); flow rate: 1.0 mL/minute; Injection volume: 100 μL; detector: Agilent Refractive Index detector, 35° C.; and calibration curve: PL Polystyrene (PS) Narrow standards (Part No.: 2010-0101) with PS equivalent molecular weights ranging from 2329000 to 162 g/mol.

Transparency

Test coating compositions were applied onto a black and white card with 150 μm wet films and dried at 25° C. for 4 hours. The resultant dry coating films in the black area were visually inspected for transparency. No haze or whitening indicates good transparency. Otherwise, if haze or whitening is observed, transparency of the films is unacceptable and marked as "fail".

Gloss Test

Gloss test was conducted according to GB/T 23999-2009 standard (China national standard for water-based coatings for woodenware for indoor decorating and refurbishing). Test coating compositions were applied to a black and white card with 120 μm wet films and allowed to dry at 50° C. for 48 hours. The obtained coated panels were tested by using BYK Micro-TRI-gloss (Cat No. 4563) for 60° gloss values.

Konig Hardness Test

Test coating compositions were applied to a glass with 120 μm wet films and allowed to dry at 50° C. for 48 hours. The konig hardness of the obtained coating films was measured by using BYK Pendulum hardness tester.

Pencil Hardness Test

Pencil hardness was tested according to GB/T 23999-2009 standard on coating films made as disclosed below on a glass substrate. Test coating compositions were first drawn down on a glass substrate at 120 μm wet thickness, dried at room temperature (23±2° C.) for 20 minutes (min), and then further dried at 50° C. for 2 days. The resultant coating films were used for pencil hardness testing. The hardness of the hardest pencil lead that does not leave a mark on the coating films is recorded as the pencil hardness. A pencil hardness of F or harder is acceptable.

Alcohol Resistance, Acid Resistance, and Alkali Resistance

Alcohol resistance, acid resistance, and alkali resistance of coating films was determined according to BS EN 12720: 2009, respectively. Panels were prepared by first brush applying ROSHIELD™ 3311 acrylic emulsion (The Dow Chemical Company, ROSHIELD is a trademark of The Dow Chemical Company) on wood at 80-90 g/m$^2$, and then were left at room temperature for 4 hours to form a first coat, followed by sanding with sand paper. Test coating compositions were further applied on the first coat at 80-90 g/m$^2$, and then the obtained panels with coatings were allowed to dry at room temperature for 30 min then in an oven at 50° C. for 48 hours before evaluating alcohol resistance, acid resistance and alkali resistance, respectively.

Alcohol resistance: Disc type filter paper saturated with an aqueous solution of ethanol (48%) was placed on the above obtained coated panels, and then covered with a cap to reduce evaporation. After 1 hour, the cap and filter paper were removed. The test area was wiped with facial tissues and allowed to dry at room temperature for another 1 hour. The test area was then observed and rated for damage degree on a scale of 0-5, where 0 is the worst and 5 is the best. An acceptable alcohol resistance rating is 4 or higher. The higher the rating, the better the alcohol resistance.

Acid resistance: Disc type filter paper saturated with an aqueous solution of glacial acetic acid (10%) was placed on the above obtained coated panels, and then covered with a cap to reduce evaporation. After 16 hours, the cap and filter paper were removed. The test area was wiped with facial tissues and allowed to dry at room temperature for another 1 hour. The test area was then observed and rated for damage degree on a scale of 0-5, where 0 is the worst and 5 is the best. An acceptable acid resistance rating is 4 or higher. The higher the rating, the better the acid resistance.

Alkali resistance: Disc type filter paper saturated with an aqueous solution of sodium carbonate (10%), placed on the above obtained coated panels, and then covered with a cap to reduce evaporation. After 16 hours, the cap and filter paper were removed. The test area was wiped with facial tissues and allowed to dry at room temperature for another 1 hour. The test area was then observed and rated for damage degree on a scale of 0-5, where 0 is the worst and 5 is the best. An acceptable alkali resistance rating is 4 or higher. The higher the rating, the better the alkali resistance.

Ratings for alcohol resistance, acid resistance, and alkali resistance are shown as below, 5: No change: test area indistinguishable from adjacent surrounding area.

4: Slight change: test area distinguishable from adjacent surrounding area, only when the light source is mirrored on the test surface and is reflected towards the observer's eyes, e.g., discoloration, change in gloss and color, and no change in structure of surface, e.g., swelling, fiber raising, cracking and blister;

3: Moderate change: test area distinguishable from adjacent surrounding area, visible in all viewing directions, e.g., discoloration, change in gloss and color, and no change in structure of surface, e.g., swelling, fiber raising, cracking and blister;

2: Significant change: test area clearly distinguishable from adjacent surrounding area, visible in all viewing directions, e.g., discoloration, change in gloss and color, and/or structure of surface slightly changed, e.g., swelling, fiber raising, cracking and blister;

1: Strong change: the structure of surface being distinctly changed, and/or discoloration, change in gloss and color, and/or the surface being totally or partially removed, and/or the filter paper adhering to the surface.

MEK Resistance Double Rub Test

MEK resistance double rub test was conducted according to ASTM D5402 (1999). Test coating compositions were drawn down on glass panels at 120 μm wet thickness. After surface drying at room temperature for 20 min, the panels were further dried at 50° C. for 2 days. The resultant coated panels were used for MEK double rub resistance test. An Atlas crockmeter was used to perform the double rubs and cheesecloth was used to hold enough MEK solution (100%). The number of double rubs it takes for the first breakthrough of the coating film to occur is recorded. The number of double rubs being 30 or higher is acceptable. The higher the number of double rubs, the better MEK resistance.

Impact Resistance

Impact resistance of coating films was determined according to GB/T 23999-2009 standard (6.4.12). Test coating compositions were applied on a tin plate at a wet thickness of 120 μm, dried at room temperature for 30 min, and then put it into an oven at 50° C. for 48 hours prior to impact resistance testing. An impact hammer (weight: 0.907 kg (2 lb)) with a spherical head with a diameter of 12.7 mm was applied. At least 3 points of the obtained coating film were tested. Deformation area of the coating film after the testing was observed by the naked eye. The highest drop height of the hammer that causes no peeling or cracking on at least three points of the coating film is recorded. An acceptable impact resistance is 20 cm or higher.

Flexibility Test

Flexibility test was conducted by using QTX film flexibility tester from Shanghai Modern Environmental Engineering Co., Ltd. Test coating compositions were applied to an iron plate (50 mm*15 mm*1 mm) and allowed to dry at 50° C. for 48 hours. The resulted coated plate was bended at different scale bars. The minimum diameter of a scale bar that the coated plate shows no cracking after bending is recorded as the flexibility value.

Synthesis of Comparative Polymer Emulsion 1 (CPE 1):

Preparation of monomer emulsion: Fes 993 surfactant (48.57 g, 30% active) was dissolved in DI water (233.75 g), with stirring. Then monomers listed in Table 1 and n-DDM (17.26 g) were slowly added to the resultant agitated solution to obtain a monomer emulsion.

A solution containing Fes 993 surfactant (8.57 g, 30% active) and DI water (671.64 g) was placed in a 3 L flask and heated to 86° C. under nitrogen ($N_2$). An aqueous initiator solution of APS (1.29 g APS in 11.8 g DI water), and 4.00% of the monomer emulsion were added to the flask. In about 5 min, initiation of polymerization was confirmed by the increase of temperature by 3° C. and a change of the external appearance of the reaction mixture. After heat generation ended, a solution of $Na_2CO_3$ (1.29 g in 17.4 g DI water) was charged into the flask. Then the remainder of the monomer emulsion was added gradually to the flask over 120 min, with stirring. At the same time, an aqueous initiator solution of APS (1.29 g in 63.75 g DI water) was gradually added to the flask over 120 min. Polymerization reaction temperature was maintained at 84-86° C. After the addition was completed, a rinse of DI water (54 g) was added back to the flask. Upon completing the addition, the reaction mixture was held at 70° C. for 60 min. The reaction was then cooled to 50° C. and neutralized to pH 7.0-8.5 by ammonia (25%). The mixture in the flask was held at 45-50° C. for 10 min, diluted with DI water (80 g), and then cooled to room temperature to get a polymer emulsion.

Synthesis of CPE 2:

The polymer emulsion of CPE 2 was prepared as in the synthesis of CPE 1, except the monomers used in the preparation of the monomer emulsion are listed in Table 1.

Synthesis of Polymer Emulsion 1 (PE 1):

The polymer emulsion of PE 1 was prepared as in the synthesis of CPE 1, except the monomer emulsion was prepared as follows: Fes 993 surfactant (14.37 g, 30% active) and ME 6112 surfactant (44.21 g, 20% active) were dissolved in DI water (233.75 g), with stirring. Then monomers listed in Table 1 and n-DDM (17.26 g) were slowly added to the resultant agitated solution to obtain a monomer emulsion.

Synthesis of PE 2:

The polymer emulsion of PE 2 was prepared as in synthesis of CPE 1, except the monomer emulsion was prepared as follows: Fes 993 surfactant (20.13 g, 30% active) and LRP 10 surfactant (43.15 g, 20% active) were dissolved in DI water (233.75 g), with stirring. Then monomers listed in Table 1 and n-DDM (17.26 g) were slowly added to the resultant agitated solution to obtain a monomer emulsion.

Synthesis of PE 3:

The polymer emulsion of PE 3 was prepared as in the synthesis of CPE 1, except the monomer emulsion was prepared as follows: Fes 993 surfactant (20.13 g, 30% active) and PP-7025 surfactant (34.52 g, 25% active) were dissolved in DI water (233.75 g), with stirring. Then monomers listed in Table 1 and n-DDM (17.26 g) were slowly added to the resultant agitated solution to obtain a monomer emulsion.

The obtained polymer had a Mw of 35,290 g/mol and a Mn (number average molecular weight) of 7,700 g/mol as determined by the GPC analysis described above.

Synthesis of PE 4:

Preparation of monomer emulsion: Fes 993 surfactant (8.05 g, 30% active) and LRP 10 surfactant (17.26 g, 20% active) were dissolved in DI water (93.50 g), with stirring. Then monomers listed in Table 1 and n-DDM (6.90 g) were slowly added to the resultant agitated solution to obtain a monomer emulsion.

A solution containing Fes 993 surfactant (3.43 g, 30% active) and DI water (273 g) was placed in a 1 L flask and heated to 86° C. under $N_2$. An aqueous initiator solution of APS (0.52 g APS in 4.7 g DI water), and 4.00% of the monomer emulsion were added to the flask. In about 5 min, initiation of polymerization was confirmed by the increase of temperature by 3° C. and a change of the external appearance of the reaction mixture. After heat generation ended, a solution of $Na_2CO_3$ (0.52 g in 6.98 g DI water) was charged into the flask. Then the remainder of the monomer emulsion was added gradually to the flask over 120 min, with stirring. At the same time, an aqueous initiator solution of APS (0.52 g in 25.5 g DI water) was gradually added to the flask over 120 min. Polymerization reaction temperature was maintained at 84-86° C. After the addition was completed, a rinse of DI water (22 g) was added back to the flask. Upon completing the addition, the reaction mixture was held at 70° C. for 60 min. The reaction was then cooled to 50° C. and then neutralized to pH 7.0-8.5 by ammonia (25%). The mixture in the flask was held at 45-50° C. for 10 min, diluted with DI water (33 g), and then cooled to room temperature to get a polymer emulsion.

Synthesis of PE 5:

The polymer emulsion of PE 5 was prepared as in the synthesis of PE 4, except the monomer emulsion was prepared as follows: Fes 993 surfactant (8.05 g, 30% active) and AR-1025 surfactant (13.8 g, 25% active) were dissolved in DI water (93.50 g), with stirring. Then monomers listed in Table 1 and n-DDM (6.98 g) were slowly added to the resultant agitated solution to obtain a monomer emulsion.

Synthesis of PE 6:

The polymer emulsion of PE 6 was prepared as in the synthesis of PE 4, except the monomer emulsion was prepared as follows: Fes 993 surfactant (13.83 g, 30% active) and LRP 10 surfactant (8.63 g, 20% active) were dissolved in DI water (93.50 g), with stirring. Then monomers listed in Table 1 and n-DDM (6.98 g) were slowly added to the resultant agitated solution to obtain a monomer emulsion.

Synthesis of PE 7:

The polymer emulsion of PE 7 was prepared as in the synthesis of PE 4, except the monomer emulsion was prepared as follows: Fes 993 surfactant (8.05 g, 30% active) and ME 6112 surfactant (17.25 g, 20% active) were dissolved in DI water (93.50 g), with stirring. Then monomers listed in Table 1 and n-DDM (6.98 g) were slowly added to the resultant agitated solution to obtain a monomer emulsion.

Synthesis of CPE 3:

The polymer emulsion of CPE 3 was prepared as in the synthesis of PE 4, except monomers used in the preparation of the monomer emulsion are listed in Table 1.

Synthesis of CPE 4:

The polymer emulsion of CPE 4 was prepared as in the synthesis of PE 1, except monomers used in the preparation of the monomer emulsion are listed in Table 1.

Synthesis of PE 8:

The polymer emulsion of PE 8 was prepared as in the synthesis of PE 7, except monomers used in the preparation of the monomer emulsion are listed in Table 1.

Synthesis of CPE 5:

The polymer emulsion of CPE 5 was prepared as in the synthesis of PE 7, except monomers used in the preparation of the monomer emulsion are listed in Table 1.

Synthesis of PE 9:

The polymer emulsion of PE 9 was prepared as in the synthesis of PE 7, except monomers used in the preparation of the monomer emulsion are listed in Table 1.

Properties of the above obtained polymer emulsions are given in Table 2.

TABLE 1

Monomers used for preparing polymer emulsions

| Polymer | ST (g) | ACE (g) | MAA (g) | MMA (g) | PEM (g) | HEMA (g) | BA (g) |
|---|---|---|---|---|---|---|---|
| CPE 1 | 438.50 | 400.57 | 26.29 | 0 | 0 | 0 | 0 |
| CPE 2 | 438.50 | 400.57 | 17.53 | 4.38 | 4.38 | 0 | 0 |
| PE 1 | 438.50 | 400.57 | 17.53 | 4.38 | 4.38 | 0 | 0 |
| PE 2 | 438.50 | 400.57 | 17.53 | 4.38 | 4.38 | 0 | 0 |
| PE 3 | 438.50 | 400.57 | 17.53 | 4.38 | 4.38 | 0 | 0 |
| PE 4 | 178.86 | 160.23 | 7.01 | 0 | 0 | 0 | 0 |
| PE 5 | 175.40 | 160.23 | 7.01 | 1.73 | 1.73 | 0 | 0 |
| PE 6 | 175.40 | 160.23 | 7.01 | 1.73 | 1.73 | 0 | 0 |
| PE 7 | 110.47 | 225.53 | 7.01 | 1.73 | 1.73 | 0 | 0 |
| CPE 3 | 171.49 | 86.73 | 7.01 | 1.73 | 1.73 | 32.10 | 45.66 |
| CPE 4 | 436.44 | 0 | 17.44 | 4.36 | 4.36 | 174.41 | 226.18 |
| PE 8 | 162.91 | 121.43 | 7.01 | 1.73 | 1.73 | 16.68 | 34.69 |
| CPE 5 | 170.88 | 138.78 | 7.01 | 1.73 | 1.73 | 0 | 26.02 |
| PE 9 | 172.27 | 104.09 | 7.01 | 1.73 | 1.73 | 24.46 | 34.69 |

TABLE 2

Properties of polymer emulsions

| Polymer emulsion | pH | Solids content[1] (%) | Viscosity[2] (centipoise) | Particle size (nm) | MFFT[3] (° C.) | OH content[4] (%) |
|---|---|---|---|---|---|---|
| CPE 1 | 8.73 | 42.07 | 65 | 97.4 | 33 | 2.50 |
| CPE 2 | 7.69 | 42.5 | NA | 104 | 33 | 2.50 |
| PE 1 | 7.52 | 42.5 | NA | 127 | 33 | 2.50 |
| PE 2 | 7.43 | 40.33 | 24 | 114 | 30 | 2.50 |
| PE 3 | 7.74 | 40.48 | 23 | 110 | 33 | 2.50 |
| PE 4 | 8.25 | 39.11 | 17 | 135 | 30.4 | 2.50 |
| PE 5 | 7.91 | 41.02 | 32 | 106 | 30.4 | 2.50 |
| PE 6 | 7.7 | 40.97 | 31 | 113 | 30.4 | 2.50 |
| PE 7 | 7.78 | 40.9 | 54 | 119 | <5 | 3.50 |
| CPE 3 | 7.48 | 41.53 | 94 | 97 | 35.9 | 2.50 |
| CPE 4 | 7.25 | 42.42 | 252 | 96 | 39.7 | 2.50 |
| PE 8 | 7.76 | 40.45 | 125 | 100 | 22.8 | 2.50 |
| CPE 5 | 7.34 | 40.82 | 26 | 122 | 22.8 | 2.17 |
| PE 9 | 7.42 | 41.05 | 104 | 111 | 35 | 2.50 |

[1] Solids content was measured by weighting 0.7 ± 0.1 g of an emulsion or coating sample (wet weight of the sample is denoted as "W1"), putting the sample into an aluminum pan (weight of aluminum pan is denoted as "W2") in an oven at 150° C. for 25 min, and then cooling and weighting the aluminum pan with the dried sample with total weight denoted as "W3"; where W3 − W2 refers to the solids or dry weight of the sample. Solids content is calculated by (W3 − W2)/W1 * 100%;
[2] Viscosity measured by Brookfield viscometer DV-I Primer (60 rpm, spindle #2);
[3] MFFT was measured by casting a 75 μm wet film of an emulsion on a heating plate with a gradient temperature using Coesfeld MFFT instrument. The film was dried and the minimum temperature at which a coherent film is formed was recorded as the MFFT.
[4] OH content, by weight based on solids or dry weight of the emulsion polymer.

Coating Compositions Examples (Exs) 1-9 and Comp Exs 1-5

Coating compositions and comparative coating compositions were prepared based on Formulations I, II, and III given in Table 3, where the polymer emulsions prepared above were used as binders. The coating compositions of Exs 1-6, and 8-9 and comparative coating compositions of Comp Exs 1-4 were prepared using the binders of PE 1-PE 6, PE 8-PE 9 and CPE 1-4 obtained above, respectively, based on Formulation I. The coating composition of Ex 7 was prepared by using the binder of PE 7 based on Formulation II. The comparative coating composition of Comp Ex 5 was prepared by using the binder of CPE 5 based on Formulation III. The mole ratio of NCO group to OH group in each coating composition was 1.5:1. Ingredients in the component A were mixed using a conventional lab mixer. The resultant component A of each coating composition was left overnight, and then component B was added into the component A and stirred using a high speed Cowles disperser at 600 rpm for 10 min to form the coating compositions. The resultant coating compositions were evaluated for properties according to the test methods described above and results are given in Table 4.

TABLE 3

Coating compositions

| | Coating Composition | | |
|---|---|---|---|
| | Formulation I for Exs 1-6 and 8-9; Comp Exs 1-4 | Formulation II for Ex 7 | Formulation III for Comp Ex 5 |
| | Binder Type | | |
| | PE 1 to PE 6, PE 8 and PE 9, CPE 1 to CPE 4 | PE 7 | CPE 5 |
| Component A | | | |
| Binder | 43.00 | 38.00 | 45.00 |
| H$_2$O | 44.13 | 47.17 | 43.69 |
| DPnB | 2.90 | 2.90 | 2 |
| BYK-346 | 0.50 | 0.50 | 0.5 |
| BYK-028 | 0.30 | 0.30 | 0.3 |
| Acematt 3300 | 1.00 | 1.00 | 1.00 |
| RM-845 | 0.30 | 0.30 | 0.30 |
| Component B | | | |
| Aquolin 268 | 7.87 | 9.83 | 7.21 |
| Total, gram | 100.00 | 100.00 | 100.00 |
| Solids content | 25.3% | 25.4% | 25.6% |

As shown in Table 4, the coating compositions of Exs 1-9 all provided coatings made therefrom with good alkali resistance, alcohol resistance, and acid resistance properties with all rating as 4, and good MEK resistance to sustain at least 30 double rubs, without compromising other properties including transparency, hardness, impact resistance, and flexibility. Particularly, the coating compositions of Exs 1~4 provided coating films with even better MEK resistance to sustain more than 50 double rubs. In contrast, the comparative coating compositions of Comp Exs 1-5 comprising CPE 1-5 binders, respectively, failed to provide coatings with one or more of the properties provided by the coating compositions of the present invention, for example, poor alcohol resistance (Comp Exs 1-4), poor acid resistance and unsatisfactory MEK resistance (Comp Ex 5).

TABLE 4

Properties of coating compositions

| Coating | Binder | Gloss (60°) | Transparency | Konig hardness | Pencil hardness | Impact resistance, cm | Flexibility, mm | Alkali resistance | Alcohol resistance | Acid resistance | MEK resistance* |
|---|---|---|---|---|---|---|---|---|---|---|---|
| Comp Ex 1 | CPE 1 | 17.6 | good | 137 | F | 20 | <1 | 4 | 3 | 4 | 39 |
| Comp Ex 2 | CPE 2 | 24.0 | good | 152 | F | 30 | <1 | 4 | 3 | 4 | 50 |
| Ex 1 | PE 1 | 40.8 | good | 154 | F | >80 | <1 | 4 | 4 | 4 | 56 |
| Ex 2 | PE 2 | 29.8 | good | 143 | F | 25 | <1 | 4 | 4 | 4 | 62 |
| Ex 3 | PE 3 | 24.9 | good | 125 | F | 50 | <1 | 4 | 4 | 4 | 65 |
| Ex 4 | PE 4 | 36.3 | good | 114 | F | 35 | <1 | 4 | 4 | 4 | 68 |
| Ex 5 | PE 5 | 33.1 | good | 108 | H | 50 | <1 | 4 | 4 | 4 | 43 |
| Ex 6 | PE 6 | 21.2 | good | 157 | F | 50 | <1 | 4 | 4 | 4 | 42 |
| Ex 7 | PE 7 | 22.8 | good | 134 | F | 55 | <1 | 4 | 4 | 4 | 83 |
| Comp Ex 3 | CPE 3 | 39 | NA | 148 | F | 60 | <1 | 4 | 2 | 4 | 50 |
| Comp Ex 4 | CPE 4 | 22.8 | NA | 130 | F | 80 | <1 | 4 | 2 | 4 | 69 |
| Ex 8 | PE 8 | 29.7 | good | 131 | HB | 80 | <1 | 4 | 4 | 4 | 34 |
| Comp Ex 5 | CPE 5 | 42.7 | good | 157 | HB | 80 | <1 | 4 | 4 | 3 | 25 |
| Ex 9 | PE 9 | 47.3 | good | 154 | H | 40 | <1 | 4 | 4 | 4 | 72 |

*No. of MEK double rubs

What is claimed is:

1. A two-component polyurethane composition comprising an emulsion polymer and a polyisocyanate, wherein the emulsion polymer having a weight average molecular weight of 180,000 g/mol or less comprises, by weight based on the weight of the emulsion polymer,
   (a) 0.3% or more of structural units of a polymerizable surfactant,
   (b) greater than 25% of structural units of a first hydroxy-functional monomer of the following formula,

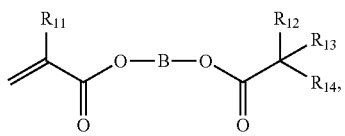

where $R_{11}$ is hydrogen or —$CH_3$; $R_{12}$, $R_{13}$, and $R_{14}$ are each independently an alkyl group; provided that $R_{12}$, $R_{13}$, and $R_{14}$ together contain from 3 to 20 carbon atoms; and B is

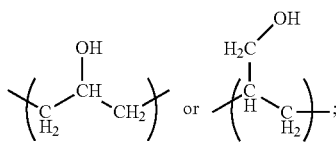

(c) from zero to 40% of structural units of a second hydroxy-functional alkyl (meth)acrylate;
   (d) structural units of an acid monomer, a salt thereof, or mixtures thereof; and
   (e) structural units of an additional monoethylenically unsaturated nonionic monomer;

wherein the emulsion polymer comprises greater than 2.2% of hydroxy groups, by weight based on the weight of the emulsion polymer.

2. The polyurethane composition of claim 1, wherein the polymerizable surfactant is selected from the group consisting of polymerizable phosphoric acid surfactants, polymerizable phosphate surfactants, polymerizable phosphonic acid surfactants, polymerizable phosphonate surfactants, or mixtures thereof.

3. The polyurethane composition of claim 1, wherein the emulsion polymer comprises from 0.5% to 1.5% of structural units of the polymerizable surfactant.

4. The polyurethane composition of claim 1, wherein the acid monomer and the salt thereof are selected from the group consisting of a carboxylic acid monomer, a phosphorous acid monomer, salts thereof, or mixtures thereof.

5. The polyurethane composition of claim 1, wherein the emulsion polymer comprises from 28% to 75% of structural units of the first hydroxy-functional monomer, by weight based on the weight of the emulsion polymer.

6. The polyurethane composition of claim 1, wherein the second hydroxy-functional alkyl (meth)acrylate is selected from the group consisting of 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, or mixtures thereof.

7. The polyurethane composition of claim 1, wherein the emulsion polymer has a weight average molecular weight of from 8,000 to 100,000 g/mol.

8. The polyurethane composition of claim 1, wherein the equivalent ratio of the total number of isocyanate group equivalents in the polyisocyanate, to the total number of hydroxyl group equivalents in the emulsion polymer is in the range of from 0.7:1 to 4:1.

9. A process of preparing the two-component polyurethane composition of claim 1, comprising: admixing the emulsion polymer with a polyisocyanate.

* * * * *